United States Patent
Oh

(10) Patent No.: US 10,026,406 B2
(45) Date of Patent: Jul. 17, 2018

(54) VEHICLE AND CONTROL METHOD THEREOF

(71) Applicant: Hyundai Motor Company, Seoul (KR)

(72) Inventor: Seok Min Oh, Gyeonggi-do (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/275,983

(22) Filed: Sep. 26, 2016

(65) Prior Publication Data

US 2017/0270932 A1    Sep. 21, 2017

(30) Foreign Application Priority Data

Mar. 15, 2016   (KR) .................. 10-2016-0030734

(51) Int. Cl.
| H04B 1/00 | (2006.01) |
| G10L 17/26 | (2013.01) |
| A01K 15/02 | (2006.01) |

(52) U.S. Cl.
CPC ............ G10L 17/26 (2013.01); A01K 15/021 (2013.01); *H04R 2499/13* (2013.01)

(58) Field of Classification Search
CPC ....................................................... G10L 17/26
See application file for complete search history.

(56) References Cited

U.S. PATENT DOCUMENTS

| 2010/0324977 A1* | 12/2010 | Dragt ................ G06Q 30/0257 705/14.1 |
| 2013/0170668 A1* | 7/2013 | Hess ........................ H03G 3/20 381/107 |

FOREIGN PATENT DOCUMENTS

| JP | 2002-133761 A | 5/2002 |
| JP | 2004-289280 A | 10/2004 |
| JP | 2011-081251 A | 4/2011 |
| KR | 10-2006-0135276 A | 12/2006 |
| KR | 2009-0131087 A | 12/2009 |
| KR | 2012-0008750 U | 12/2012 |

OTHER PUBLICATIONS

Korean Notice of Allowance for Korean Application No. 10-2016-0030734, dated Oct. 10, 2017, English Abstract.

\* cited by examiner

*Primary Examiner* — Andrew L Sniezek

(74) *Attorney, Agent, or Firm* — Mintz Levin Cohn Ferris Glovsky and Popeo, P.C.; Peter F. Corless

(57) ABSTRACT

A vehicle of outputting a sound using a difference between a human's audible frequency and a pet's audible frequency, and a method of controlling the vehicle are provided. The vehicle includes a sound processor that is configured to tune and mix a sound and a sound controller that is configured to determine a sound being output as one of a first sound having a frequency within a human's audible frequency range and a second sound having a frequency beyond the human's audible frequency range. When a command for reproducing another sound other than the determined sound is received, the sound processor is configured to mix the determined sound with the other sound corresponding to the command and a speaker is then configured to output the mixed sound.

17 Claims, 6 Drawing Sheets

VEHICLE AND CONTROL METHOD THEREOF

CROSS-REFERENCE TO RELATED APPLICATION

This application claims the benefit of Korean Patent Application No. 10-2016-0030734, filed on Mar. 15, 2016 in the Korean Intellectual Property Office, the disclosure of which is incorporated herein by reference.

BACKGROUND

1. Field of the Disclosure

The present disclosure relates to a vehicle, and more particularly, to a vehicle that outputs sounds of varying frequencies.

2. Description of the Related Art

Recently, research has been conducted regarding techniques for providing a comfortable environment for pets within a vehicle. For example, when a driver leaves a vehicle while a pet remains therein, the pet may experience anxiety or discomfort. Accordingly, technology for mitigating anxiety of pets left alone in a vehicle or for calming down pets that are scared of entering a vehicle is required.

SUMMARY

According to an aspect of the present disclosure, a vehicle is provided that may output a sound that humans and pets appreciate together using a difference between a human's audible frequency and a pet's audible frequency, and a method of controlling the vehicle. Additional aspects of the disclosure will be set forth in part in the description which follows and, in part, will be obvious from the description, or may be learned by practice of the disclosure.

In accordance with one aspect of the present disclosure, a vehicle may include: a sound processor configured to tune and mix a sound; a sound controller configured to determine a sound being output as one of a first sound of a frequency included in a human's audible frequency range and a second sound of a frequency beyond the human's audible frequency range. When a command for reproducing the other sound except for the determined sound is received, the controller may be configured to operate the sound processor to mix the determined sound with the other sound corresponding to the command. Additionally, the vehicle may include speaker configured to output the mixed sound.

When a command for reproducing the second sound is received when the first sound is output, the sound processor may be configured to mix the first sound with the second sound. When a command for reproducing the first sound is received when the second sound is output, the sound processor may be configured to tune the first sound, and mix the tuned first sound with the second sound. The vehicle may further include a memory having a first memory to store the first sound, and a second memory to store the second sound. Additionally, an analog-to-digital (AD) converter may be configured to receive the second sound from the second memory via analog communication, and to convert the second sound into a digital signal.

The sound processor may be configured to receive the first sound from the first memory via digital communication, and tune the first sound. The sound processor may be further configured to receive the second sound from the AD converter, and mix the tuned first sound with the second sound. The vehicle may further include a digital-to-analog (DA) converter configured to receive the mixed sound from the sound processor, and convert the mixed sound into an analog signal. The speaker may be configured to output the analog signal of the mixed sound converted by the DA converter.

In accordance with one aspect of the present disclosure, a method of controlling a vehicle may include: determining a sound being output as one of a first sound of a frequency included in a human's audible frequency range and a second sound of a frequency beyond the human's audible frequency range; when a command for reproducing the other sound except for the determined sound is received, mixing the decided sound with the other sound corresponding to the command; and outputting the mixed sound. The mixing of the determined sound with the other sound may include mixing the first sound with the second sound when a command for reproducing the second sound is received when the first sound is output. The mixing of the determined sound with the other sound may also include tuning the first sound when a command for reproducing the first sound is received when the second sound is output and mixing the tuned first sound with the second sound.

The method may further include: determining, when a sound is received, whether a frequency of the received sound is included in the human's audible frequency range; determining, when the frequency of the received sound is included in the human's audible frequency range, the sound as the first sound, and storing the first sound in a first memory; and determining, when the frequency of the received sound is beyond the human's audible frequency range, the sound as the second sound, and storing the second sound in a second memory. The mixing of the determined sound with the other sound may include: receiving the second sound from the second memory, when a command for reproducing the second sound is received when the first sound is output; and mixing the first sound with the second sound received from the second memory. The receiving of the second sound may include: at an analog-to-digital (AD) converter, receiving the second sound from the second memory through analog communication; and receiving the second sound converted into a digital signal by the AD converter.

The mixing of the determined sound with the other sound may include: receiving the first sound from the first memory, when a command for reproducing the first sound is received when the second sound is output; turning the first sound received from the first memory; and mixing the tuned first sound with the second sound. The receiving of the first sound may include receiving the first sound from the first memory via digital communication. The method may further include: after mixing the determined sound with the other sound corresponding to the command, at a digital-to-analog (DA) converter, converting the mixed sound into an analog signal. The outputting of the mixed sound may include outputting the mixed sound converted into the analog signal through a speaker.

In accordance with one aspect of the present disclosure, a vehicle may include: a sound controller configured to analyze an input sound to determine the input sound as one of a first sound of a frequency included in a human's audible frequency range and a second sound of a frequency beyond the human's audible frequency range; a first memory configured to store the first sound determined by the sound controller; and a second memory configured to store the second sound determined by the sound controller. The vehicle may further include a sound processor configured to tune and mix a sound, wherein the sound controller may be configured to determine a sound being output as one of the first sound and the second sound, and operate the sound processor to mix the determined sound with the other sound corresponding to the command when a command for reproducing the other sound except for the determined sound is received.

BRIEF DESCRIPTION OF THE DRAWINGS

These and/or other aspects of the disclosure will become apparent and more readily appreciated from the following description of the exemplary embodiments, taken in conjunction with the accompanying drawings of which.

DETAILED DESCRIPTION

Figure 1:
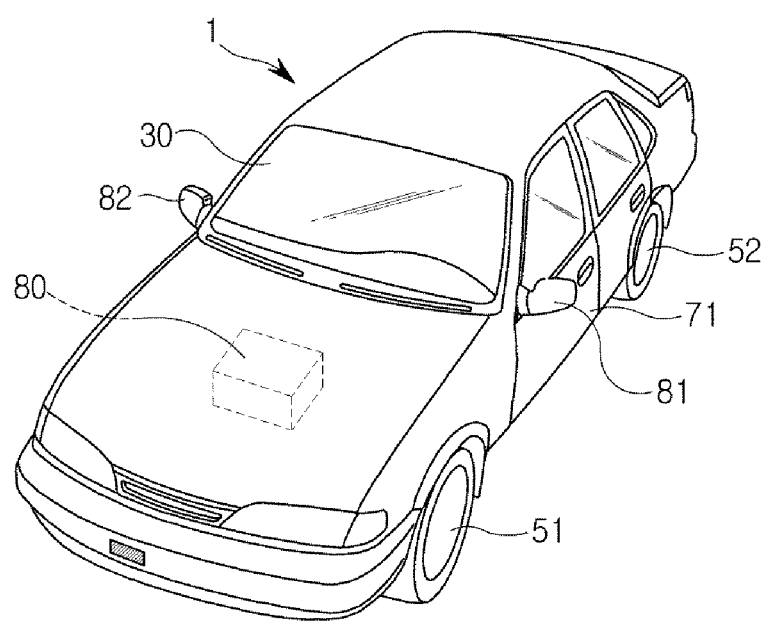
FIG. 1 is a view illustrating the appearance of a vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereinafter, exemplary embodiments of the present disclosure will be described in detail with reference to the accompanying drawings.

Referring to FIG. 1, a vehicle according to an exemplary embodiment of the present disclosure may include: a main body 1 that forms an outer appearance of the vehicle; a plurality of wheels 51 and 52 configured to move the vehicle; a driving apparatus 80 configured to rotate the wheels 51 and 52; a plurality of doors 71 configured to shield the inside of the vehicle from the outside; a front glass 30 configured to provide a driver in the inside of the vehicle with a front view of the vehicle; and side-view mirrors 81 and 82 configured to provide the driver with a rear view of the vehicle.

The wheels 51 and 52 may include a plurality of front wheels 51 disposed in the front part of the vehicle, and a plurality of rear wheels 51 disposed in the rear part of the vehicle. The driving apparatus 80 may provide rotatory power to the front wheels 51 or the rear wheels 52 to move the main body 1 forward or backward. The driving apparatus 80 may include an engine configured to burn fossil fuel to produce rotatory power, or a motor configured to receive power from a condenser (not shown) to produce rotatory power. The doors 71 may be rotatably connected to the left and right of the main body 1 to allow the driver to open a door and enter the vehicle. The doors 71 also shield the interior of the vehicle from the outside when closed.

The front glass 30 may be disposed in the upper, front part of the main body 1 to provide the driver with a front view of the vehicle. The front glass 30 may also be referred to as a windshield glass. The side-view mirrors 81 and 82 may include a left side-view mirror 81 disposed to the left of the main body 1 and a right side-view mirror 82 disposed to the right of the main body 1 to provide the driver with a view of side and rear situations of the vehicle. In addition, the vehicle may include various types of sensors configured to sense an obstacle or other interferences in the vicinity of the vehicle to help the driver recognize a situation around the vehicle. For example, the vehicle may include a plurality of imaging devices (e.g., cameras, video cameras, etc.) configured to acquire images of front, rear, left, and right views of the vehicle.

Figure 2:
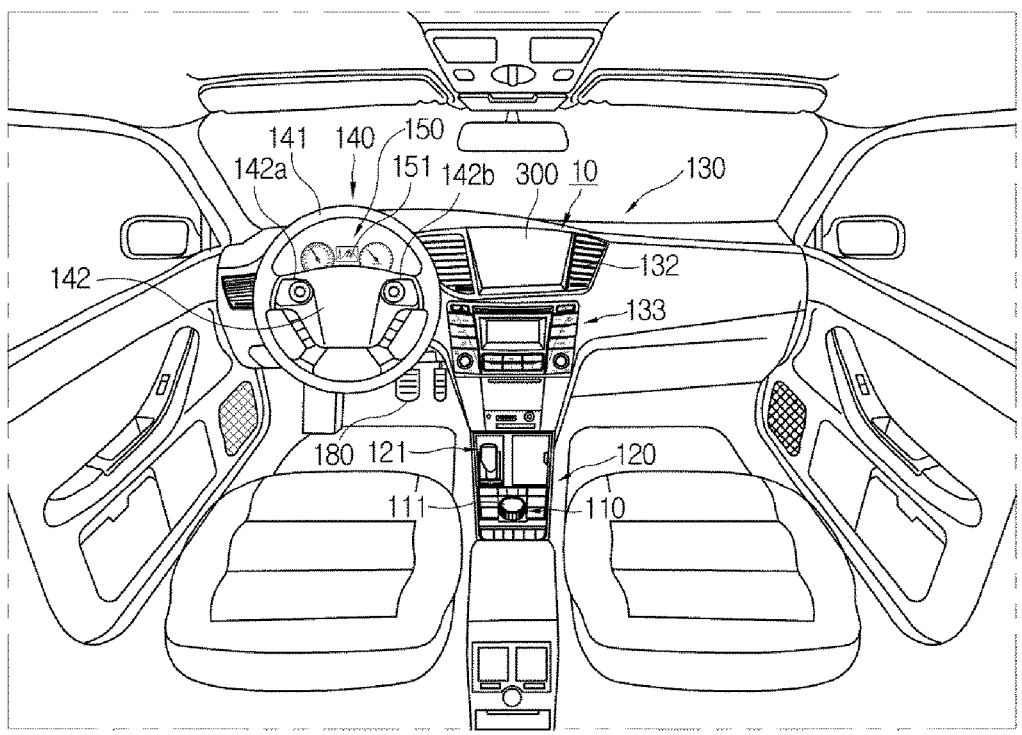
FIG. 2 is a view illustrating the internal structure of the vehicle according to an exemplary embodiment of the present disclosure.

The vehicle may include a dashboard in which a gear box 120, a center fascia 130, a steering wheel 140, an instrument panel 150, etc. are installed, as shown in FIG. 2. In the gear box 120, a gear lever 121 may be installed for shifting gears. Additionally, as shown in FIG. 2, the gear box 120 may include a dial unit 111 configured to enable a user to control execution of the functions of a navigation system 10 or a multimedia system including an audio system 133 or the main functions of the vehicle, and an input unit 110 including various buttons. In the center fascia 130, an air conditioner 132, the audio system 133, and the navigation system 10 may be installed.

The air conditioner 132 may be used to adjust the temperature, humidity, air quality, and flow of air inside the vehicle. The air conditioner 132 may be installed in the center fascia 130, and may include at least one vent 132 for discharging air. In the center fascia 130, at least one button or dial may be provided for operating the air conditioner 132. A user, for example, a driver may operate the button or dial provided on the center fascia 130 to operate the air conditioner 132 of the vehicle. Additionally, the user may operate the air conditioner 132 using the buttons of the input unit 110 or the dial unit 111 installed in the gear box 120.

According to an exemplary embodiment, in the center fascia 130, the navigation system 10 may be installed. The navigation system 10 may be embedded into the center fascia 130 of the vehicle. Additionally, in the center fascia 130, an input unit may be installed for operating the navigation system 10. The input unit of the navigation system 10 may be installed at another location, instead of the center fascia 130. For example, the input unit of the navigation system 10 may be disposed around a display unit 300 of the navigation system 10. According to another exemplary example, the input unit of the navigation system 10 may be disposed in the gear box 120.

The steering wheel 140 may be used to adjust a driving direction of the vehicle, and may include a rim 141 that is gripped by a driver, and a spoke 142 that connects the rim 141 to a hub of a steering apparatus of the vehicle 1 disposed on a rotation axis for steering. According to an exemplary embodiment, the spoke 142 may include operating units 142a and 142b for operating various types of devices (e.g., the audio system) installed in the vehicle. The steering wheel 140 may vibrate when the driver becomes drowsy to tactually warn the driver, or the steering wheel 140 may provide the driver with a warning of danger through vibration in response to detecting a risk of traffic accidents due to a change in driving environment.

Furthermore, in the dashboard, an instrument panel 150 may be disposed to display speed, revolutions per minute (RPM), and fuel gauge of the vehicle. The instrument panel 150 may include an instrument panel display unit 151 configured to display information related to the state and driving of the vehicle, information related to manipulations of the multimedia system, etc. Meanwhile, the vehicle according to the current exemplary embodiment may include an audio system used to distinguish music for human (e.g., of a frequency within a human range) from music for a pet (e.g., of a frequency that is beyond a human audible frequency) based on a human's audible frequency range and to reproduce the music for human and the music for pet. Hereinafter, the vehicle according to the current exemplary embodiment and a method of controlling the vehicle will be described in detail with reference to FIGS. 3, 4, and 5.

Figure 3:
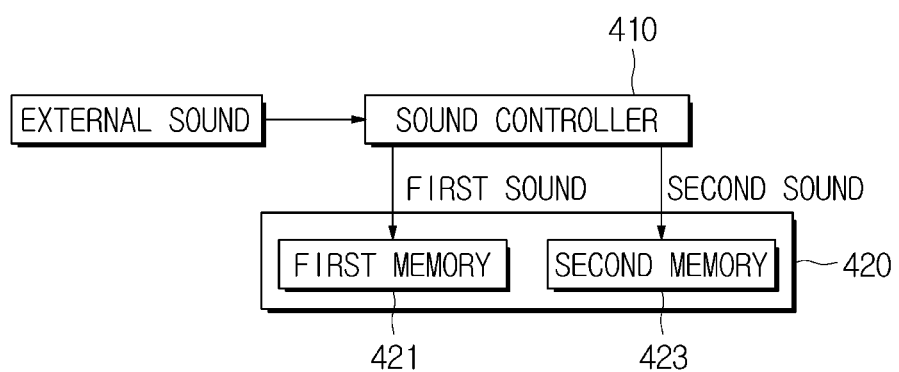
FIG. 3 and FIG. 4 are block diagrams illustrating a vehicle according to an exemplary embodiment of the present disclosure.
Figure 4:
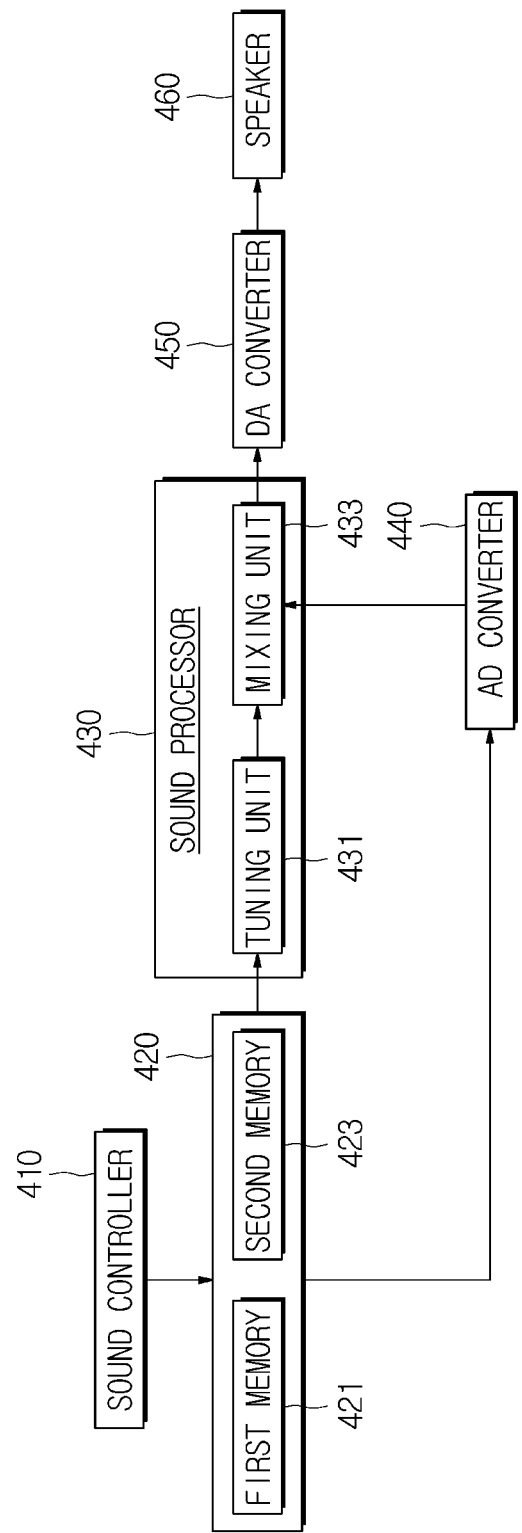

FIGS. 3 and 4 are control block diagrams of a vehicle according to an exemplary embodiment of the present disclosure. Referring to FIGS. 3 and 4, the vehicle may include: a sound controller 410 configured to analyze a frequency of an input sound to determine the input sound as one of a first sound for human and a second sound for pet; a memory 420 including a first memory 421 and a second memory 423 to store the first sound and the second sound, respectively; an analog-to-digital (AD) converter 440 configured to receive the second sound from the second memory and to convert the second sound into a digital signal; a sound processor 430 configured to receive the first sound from the first memory 421, to tune the first sound, and to mix the tuned first sound with the second sound received from the AD converter 440; a digital-to-analog (DA) converter 450 configured to convert the mixed sound output from the sound processor 430 into an analog signal; and a speaker 460 configured to output the mixed sound converted by the DA converter 450.

The input sound may be a sound stored in storage medium, such as a compact disk (CD) or a universal serial bus (USB), connected to the vehicle, or may be a sound input by pairing via a wireless communication method such as Bluetooth. When the sound is input, the sound controller 410 may be configured to analyze the frequency of the sound to determine whether the sound includes a sound of a frequency included in a human's audible frequency range. Generally, the human's audible frequency ranges from about 20 Hz to 20,000 Hz, and a pet's audible frequency, for example, a dog's audible frequency ranges from about 60 Hz to 44,000 Hz. Accordingly, dogs may be capable of hearing a sound of a high-frequency area of about 20,000 Hz to 44,000 Hz within the dog's audible frequency range, but humans are not capable of hearing the sound of the high-frequency area. In the following description, a sound included in the human's audible frequency range is referred to as a first sound, and a sound beyond the human's audible frequency range is referred to as a second sound.

When the input sound is determined as the first sound included in the human's audible frequency range, the sound controller 410 may be configured to store the first sound in the first memory 421. Additionally, when the input sound is determined as the second sound beyond the human's audible frequency range, the sound controller 410 may be configured to store the second sound in the second memory 423. The memory 420 may include the first memory 421 to store the first sound, and the second memory 423 to store the second sound, as described above. The memory 420 may include a non-volatile memory, such as a flash memory, read only memory (ROM), erasable programmable read only memory (EPROM), and electrically erasable programmable read only memory (EEPROM), as well as a volatile memory, such as dynamic-random access memory (D-RAM) and static-random access memory (S-RAM).

The sound processor 430 may be configured to tune the first sound, and mix the first sound with the second sound, under the operation of the sound controller 410. The sound processor 430 may include a tuning unit 431 configured to tune the first sound, and a mixing unit 433 configured to mix the first sound with the second sound. The sound processor 430 may further be configured to receive the first sound from the first memory 421 via a digital communication line. When the first sound is received from the first memory, the sound processor 430 may be configured to tune the first sound based on a predetermined tuning value or based on a tuning value input by a user. The sound processor 430 may be configured to output the tuned first sound independently through the speaker 460, or mix the tuned first sound with the second sound when a command for reproducing the second sound is received to output the mixed sound through the speaker 460.

The second sound may be, unlike the first sound, transferred to the AD converter 440 from the second memory 423 via an analog communication line, converted into a digital signal in the AD converter 440, and then transferred to the mixing unit 433 of the sound processor 430. Since the second sound for pet may generally be generated based on a complex frequency technology, no tuning may be performed related to sound quality on the second sound. Accordingly, the audio system of the vehicle according to the current exemplary embodiment may be configured to transfer the second sound to the mixing unit 433 of the sound processor 430 via the analog communication line, instead of the digital communication line to transfer the first sound to the sound processor 430 to prevent tuning of the second sound. When the second sound converted into the digital signal by the AD converter 440 is transferred to the mixing unit 433 of the sound processor 430, the sound processor 430 may be configured to mix the tuned first sound with the second sound under the operation of the sound controller 410 to output the mixed sound through the speaker 460, or may be configured to output the second sound not mixed with the first sound through the speaker 460.

The digital signal of the first sound, the second sound, or the mixed sound output from the sound processor 430 may be converted into an analog signal by the DA converter 450, and the analog signal may be output through the speaker 460. When the mixed sound of the first sound and the second sound is output from the speaker 460, humans may be capable of hearing the first sound without any interference of the second sound since humans are unable to hear the second sound due to the frequency thereof. Additionally, since pets are capable of hearing the second sound, the second sound may mitigate anxiety disorder of a pet when inside the vehicle.

Figure 5:
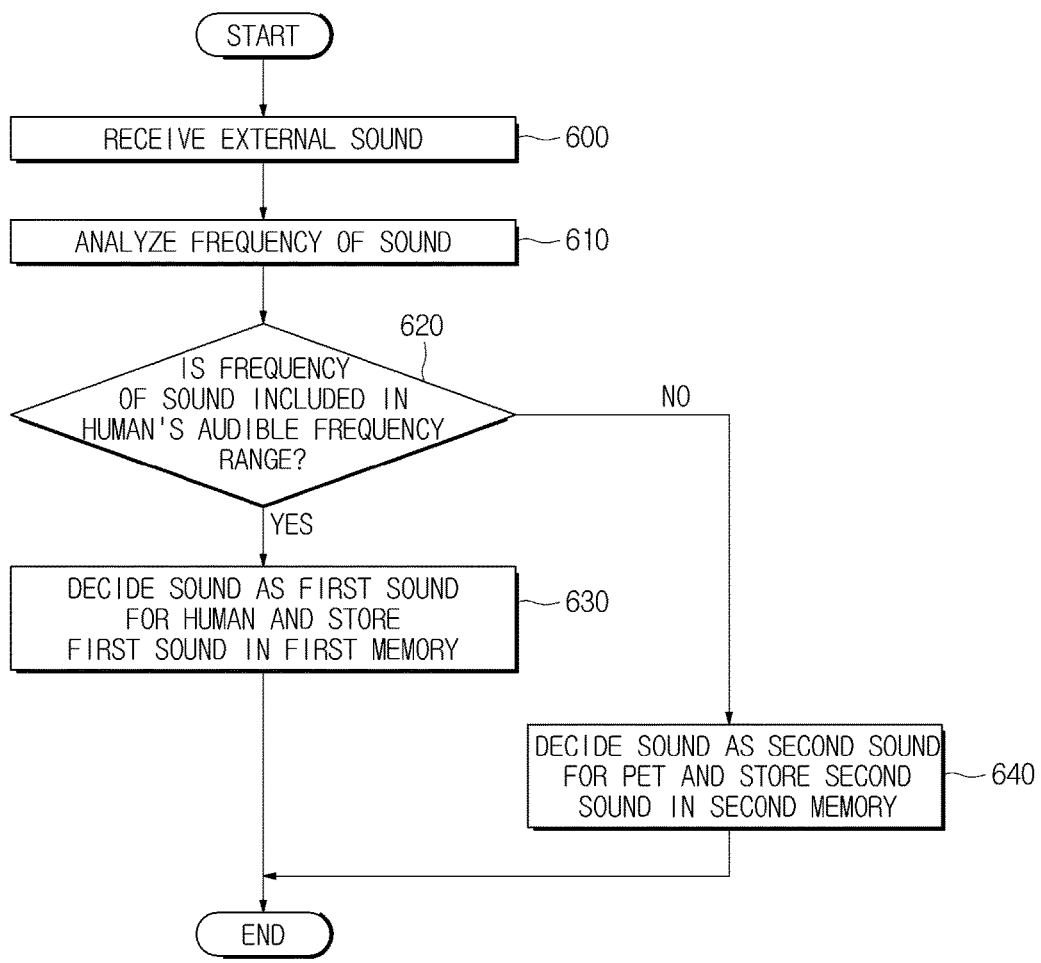
FIG. 5 and FIG. 6 are flowcharts illustrating a method for controlling a vehicle according to an exemplary embodiment of the present disclosure.
Figure 6:
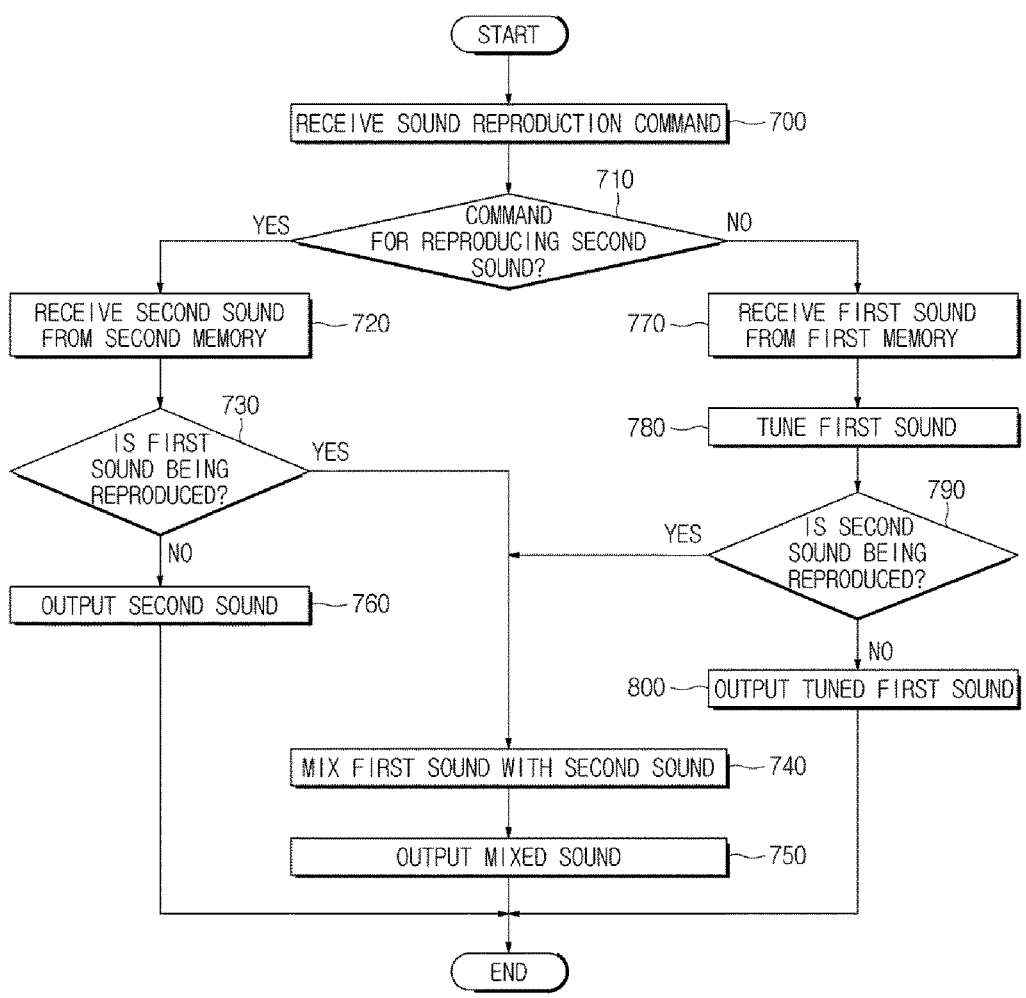

FIGS. 5 and 6 are flowcharts illustrating a method of controlling a vehicle, according to an exemplary embodiment of the present disclosure. Hereinafter, a process in which the vehicle according to the current exemplary embodiment outputs a sound will be described in more detail with reference to FIGS. 5 and 6. As shown in FIG. 5, when an external sound is received in operation 600, the sound controller 410 may be configured to analyze a frequency of the received sound, in operation 610, and determine whether a frequency of the received sound is included in a human's audible frequency range, in operation 620. When the sound controller 410 determines that the frequency of the received sound is included in the human's audible frequency range, the sound controller 410 may be configured to determine the received sound as the first sound, and store the first sound in the first memory 421, in operation 630. Further, when the sound controller 410 determines that the frequency of the received sound is beyond the human's audible frequency range, the sound controller 410 may be configured to determine the received sound as the second sound, and store the second sound in the second memory 423, in operation 640.

The received sound may be a sound stored in storage medium, such as a CD or a USB, connected to the vehicle, or may be a sound received by pairing via a wireless communication method such as Bluetooth. When the sound is received, the sound controller 410 may be configured to analyze the frequency of the sound to determine whether the received sound includes a sound of a frequency included in the human's audible frequency range. When the sound controller 410 determines that the received sound is the first sound included in the human's audible frequency range, the sound controller 410 may be configured to store the first sound in the first memory 421. However, when the sound controller 410 determines that the received sound is the second sound beyond the human's audible frequency range, the sound controller 410 may be configured to store the second sound in the second memory 423. In other words, the audio system of the vehicle according to the current exemplary embodiment may distinguish the first sound for human from the second sound for pet, and store the first sound and the second sound separately.

Referring to FIG. 6, when a sound reproduction command is received in operation 700, the sound controller 410 may be configured to determine whether the sound reproduction command is a command for reproducing the second sound, in operation 710. When the sound controller 410 determines that the sound reproduction command is a command for reproducing the second sound, the sound processor 430 may be configured to receive the second sound from the second memory 423, in operation 720, determine whether the first sound is being reproduced, in operation 730, mix the first sound with the second sound when the first sound is being reproduced, in operation 740, and then output the mixed sound through the speaker 460, in operation 750. When no first sound is being reproduced, the sound processor 430 may be configured to output the second sound through the speaker 460, in operation 760.

Additionally, when a sound reproduction command is received through the input unit, etc., the sound controller 410 may be configured to determine whether the sound reproduction command is a command for reproducing the second sound, that is, a command for reproducing a sound for pet. When a command for reproducing the second sound is received, the second sound may be transferred to the AD converter 440 from the second memory 423 via the analog communication line, converted into a digital signal in the AD converter 440, and then transferred to the mixing unit 433 of the sound processor 430.

The audio system of the vehicle according to the current exemplary embodiment may transfer the second sound to the sound processor 430 via the analog communication line, instead of the digital communication line to transfer the first sound to the sound processor 430 to prevent tuning of the second sound. When the second sound converted into the digital signal by the AD converter 440 is transferred to the sound processor 430, the sound processor 430 may be configured to mix the tuned first sound with the second sound under the operation of the sound controller 420 to output the mixed sound through the speaker 460, when the first sound is currently being reproduced. When no first sound is being reproduced, the sound processor 430 may be configured to output the second sound not mixed with the first sound through the speaker 460.

The digital signal of the second sound or the mixed sound output from the sound processor 430 may be converted into an analog signal by the DA converter 450, and then output through the speaker 460. When the sound processor 430 determines that the received sound reproduction command is not a command for reproducing the second sound, the sound processor 430 may be configured to receive the first sound from the first memory 421, in operation 770, and tune the first sound, in operation 780. When the second sound is currently being reproduced in operation 790, the sound processor 430 may be configured to mix the first sound with the second sound, in operation 740, and output the mixed sound through the speaker 460, in operation 750. When no second sound is being reproduced, the sound processor 430 may be configured to output the tuned first sound through the speaker 460, in operation 800.

Further, when a sound reproduction command is received through the input unit, etc., the sound controller 410 may be configured to determine whether the received sound reproduction command is a command for reproducing the second sound, that is, a command for reproducing a sound for pet. When the sound controller 410 determines that the sound reproduction command is not a command for reproducing the second sound, the sound processor 430 may be configured to receive the first sound from the first memory 421 via the digital communication line. When the first sound is received from the first memory 421, the sound processor 430 may be configured to tune the first sound based on a predetermined tuning value or based on a tuning value input by a user.

When the second sound is currently being reproduced, the sound processor 430 may be configured to mix the tuned first sound with the second sound under the operation of the sound controller 410, and output the mixed sound through the speaker 460. When no second sound is being reproduced, the sound processor 430 may be configured to output the tuned first sound through the speaker 460. The digital signal of the first sound or the mixed sound output from the sound processor 430 may be converted into an analog signal by the DA converter 450, and then output through the speaker 460.

According to the exemplary embodiments of the present disclosure as described above, it may be possible to mitigate anxiety disorder of pets. Although a few exemplary embodiments of the present disclosure have been shown and described, it would be appreciated by those skilled in the art that changes may be made in these exemplary embodiments without departing from the principles and spirit of the disclosure, the scope of which is defined in the claims and their equivalents.

What is claimed is:

1. A vehicle, comprising:
    a sound processor configured to adjust a frequency of and mix a sound;
    a sound controller configured to:
        determine a sound being output as one of a first sound having a frequency within a human's audible frequency range and a second sound having a frequency beyond the human's audible frequency range,
        determine, when a sound is received, whether a frequency of the received sound is within the human's audible frequency range,
        determine, when the frequency of the received sound is within the human's audible frequency range, the sound as the first sound, and store the first sound in a first memory,
        determine, when the frequency of the received sound is beyond the human's audible frequency range, the sound as the second sound, and store the second sound in a second memory, and
        operate the sound processor when a command for reproducing another sound other than the determined sound is received, to mix the determined sound with the other sound corresponding to the command; and
    a speaker configured to output the mixed sound.

2. The vehicle according to claim 1, wherein when the command for reproducing the second sound is received when the first sound is output, the sound processor is configured to mix the first sound with the second sound.

3. The vehicle according to claim 1, wherein when the command for reproducing the first sound is received when the second sound is output, the sound processor is configured to adjust a frequency of the first sound, and mix the frequency-adjusted first sound with the second sound.

4. The vehicle according to claim 1, further comprising:
    an analog-to-digital (AD) converter configured to receive the second sound from the second memory via analog communication, and to convert the second sound into a digital signal.

5. The vehicle according to claim 4, wherein the sound processor is configured to receive the second sound from the AD converter, and mix the frequency-adjusted first sound with the second sound.

6. The according to claim 1, wherein the sound processor is configured to receive the first sound from the first memory via digital communication, and adjust a frequency of the first sound.

7. The vehicle according to claim 1, further comprising:
    a digital-to-analog (DA) converter configured to receive the mixed sound from the sound processor, and to convert the mixed sound into an analog signal.

8. The vehicle according to claim 7, wherein the speaker is configured to output the analog signal of the mixed sound converted by the DA converter.

9. A method of controlling a vehicle, comprising:
    determining, by a controller, a sound being output as one of a first sound having a frequency within a human's audible frequency range and a second sound having a frequency beyond the human's audible frequency range;
    determining, by the controller, when a sound is received, whether a frequency of the received sound is within the human's audible frequency range;
    determining by the controller, when the frequency of the received sound is within the human's audible frequency range, the sound as the first sound, and storing the first sound in a first memory;
    determining, by the controller, when the frequency of the received sound is beyond the human's audible frequency range, the sound as the second sound, and storing the second sound in a second memory;
    when a command for reproducing another sound other than the determined sound is received, mixing, by the controller, the determined sound with the other sound corresponding to the command; and
    outputting, by the controller, the mixed sound.

10. The method according to claim 9, wherein the mixing of the determine sound with the other sound includes mixing the first sound with the second sound when the command for reproducing the second sound is received when the first sound is output.

11. The method according to claim 9, wherein the mixing of the determined sound with the other sound includes:
    adjusting, by the controller, a frequency of the first sound when a command for reproducing the first sound is received when the second sound is output; and
    mixing, by the controller the frequency-adjusted first sound with the second sound.

12. The method according to claim 9, wherein the mixing of the determined sound with the other sound includes:
    receiving by the controller, the second sound from the second memory, when a command for reproducing the second sound is received when the first sound is output; and
    mixing, by the controller, the first sound with the second sound received from the second memory.

13. The method according to claim 12, wherein the receiving of the second sound includes:
    at an analog-to-digital (AD) converter, receiving the second sound from the second memory via analog communication; and
    receiving by the controller, the second sound converted into a digital signal by the AD converter.

14. The method according to claim 9, wherein the mixing of the determined sound with the other sound includes:
    receiving by the controller, the first sound from the first memory, when a command for reproducing the first sound is received when the second sound is output;
    turning by the controller, the first sound received from the first memory; and mixing, by the controller, the frequency-adjusted first sound with the second sound.

15. The method according to claim 14, wherein the receiving of the first sound includes:
receiving, by the controller, the first sound from the first memory via digital communication.

16. The method according to claim 9, further comprising:
after mixing the determined sound with the other sound corresponding to the command, at a digital-to-analog (DA) converter, converting the mixed sound into an analog signal.

17. The method according to claim 16, wherein the outputting of the mixed sound includes:
outputting, by the controller, the mixed sound converted into the analog signal through a speaker.

* * * * *